Patented Sept. 21, 1948

2,449,640

UNITED STATES PATENT OFFICE 2,449,640

SOLUTIONS OF RIBOFLAVIN

Jesse Charney, New York, N. Y., assignor to Wyeth Incorporated, Philadelphia, Pa., a corporation of Delaware No Drawing. Application June 11, 1946,
Serial No. 676,097

6 Claims. (Cl. 167—81)

This invention relates to solutions of riboflavin (6,7-dimethyl-9-d-ribitylisoalloxazine) and more particularly to high concentrative solutions of riboflavin and multi-vitamin solutions containing riboflavin for oral and parenteral use.

It is known that water alone will dissolve about 0.13 milligram of riboflavin per cubic centimeter (0.013%) at room temperature while more concentrated solutions prepared by means of heating will crystallize out on standing. However, water solutions of riboflavin are so low in concentration as to require excessively large volumes for administration. This also applies in about the same degree to multi-vitamin solutions containing riboflavin.

The art has therefore sought for solubilizing agents which possess a stronger dissolving action for riboflavin and multi-vitamin compositions containing riboflavin than water alone, and which at the same time possess the very important qualities of yielding solutions which are physiologically non-toxic and also stable over a relatively long period of time.

As a substitute for water and particularly when preparing multi-vitamin solutions, propylene glycol (1,2-propanediol) has been found useful as a solvent, and solutions of riboflavin or multi-vitamin solutions containing riboflavin in propylene glycol have been found to be capable of use either orally or parenterally without serious toxic effects. However, propylene glycol will dissolve only about 0.103 milligram of riboflavin per cubic centimeter (0.01%) at room temperature and is therefore unsatisfactorily low in the amount of riboflavin it will dissolve.

As in the case of water, the necessity exists for a solubilizing agent that would increase the dissolving power of propylene glycol for riboflavin or multi-vitamin compositions containing riboflavin.

It is an object of this invention, therefore, to obtain stable and non-toxic solutions of riboflavin of higher concentration than can be obtained by water or propylene glycol alone.

A further object of this invention is to obtain stable and non-toxic solutions of multi-vitamin compositions containing riboflavin with higher concentrations of said compositions than can be obtained by water or propylene glycol alone.

It has been found that the monohydroxy, monoalkoxy benzaldehydes are excellent solubilizing agents for riboflavin and multi-vitamin compositions containing riboflavin, particularly monohydroxy, monomethoxy or ethoxy benzaldehydes and more particularly, vanillin.

From a toxicity and solubility standpoint, the alkoxy group should contain not more than 5 carbon atoms, and as stated above, the monomethoxy and monoethoxy derivatives are considered the best. Hereinafter, reference to monohydroxy, monoalkoxy benzaldehydes in the specification and the claims is intended to mean those benzaldehyde derivatives having one to five carbon atoms in the alkoxy group.

These compounds have been found to sharply increase the amount of riboflavin that can be placed in solution either in water or propylene glycol. Furthermore, and specifically with regard to vanillin and ethyl-vanillin, these solubilizing agents impart to the solutions a pleasant and palatable taste and odor making them particularly valuable for oral use. As a still further advantage over known solubilizing agents, the monohydroxy, monoalkoxy benzaldehydes do not require acidic or basic adjustment in pH for safe parenteral use since they do not possess appreciable acidic or basic properties.

Solutions of monohydroxy, monoalkoxy benzaldehydes in water and in propylene glycol have been found to be stable and physiologically non-toxic. With respect to stability, storage tests for more than six months show clear solutions. These compounds have also been found non-toxic. As a specific example, tests show that a daily ingestion of 20 mg./kilogram of vanillin or ethyl-vanillin by rats was found to be harmless.

For the purpose of illustration of an embodiment of the invention, and without limitation as to the particular monohydroxy, monoalkoxy benzaldehyde used, the following data with regard to vanillin is illustrative of the invention.

With specific reference to vanillin, it is known that at room temperature, the solubility of vanillin in water is 1% and in propylene glycol about 10%. On the basis of a 1% solution in water at 25° C., vanillin has been found to dissolve 0.516 milligram of riboflavin per cubic centimeter. A 1% solution of vanillin in propylene glycol at 25° C. will dissolve 0.15 milligram of riboflavin per cubic centimeter.

It has been additionally discovered that the amount of riboflavin may be materially increased when heating the mixture for 5 to 10 minutes at about 100° C. Thus, a 1% solution of vanillin in water at 100° C. will dissolve about 2 milligrams of riboflavin per cubic centimeter and a 1% solution of vanillin in propylene glycol at about 100° C. will dissolve about 1.1 milligrams of riboflavin per cubic centimeter without a subsequent precipitation on cooling. As can be seen, this is a considerable increase over the 0.13 milligram/cc.

for water alone and 0.103 milligram/cc. for propylene glycol alone and materially above that when solubilizing at room temperature. After cooling the resulting solutions, no precipitation has been found, even after a considerable storage period.

The ability of the solubilizing agents to dissolve and hold in a stable solution more riboflavin at 100° C. than at room temperature is a surprising characteristic since in the absence of the solubilizing agent, riboflavin will crystallize out of solution from hot concentrated solutions, on cooling to room temperature.

In the preparation of aqueous or propylene glycol solutions containing monohydroxy, monoalkoxy benzaldehydes, the solutions may contain either riboflavin alone or riboflavin together with nicotinamide, thiamine hydrochloride, calcium pantothenate, vitamin B6 hydrochloride, alpha and beta pyracine and other water-soluble growth promoting and accessory factors such as pantothenic acid, folic acid, biotin, choline chloride, inositol and ascorbic acid.

All of these substances in solution with the exception of ascorbic acid may be heated or autoclaved without loss of potency. When ascorbic acid is to be an ingredient of the final solution, it is added after the heat treatment because of its heat-sensitivity.

The following examples are illustrative of the invention:

Example I 10 grams of vanillin, 2 grams of riboflavin and one liter of water are heated to 100° C. and held at that temperature until complete solution is obtained. The solution is cooled to room temperature and filtered.

Example II 10 grams of vanillin, 3 grams of riboflavin, 100 grams of nicotinamide and 5 grams each of thiamine hydrochloride, calcium pantothenate, vitamin B6 hydrochloride and one liter of water are heated at 100° C. until complete solution is obtained. The solution is then cooled and filtered.

Example III

A multi-vitamin solution is prepared as disclosed in Example II. 10 grams of vitamin C (ascorbic acid) is dissolved in the cooled solution before filtration.

Example IV 10 grams of vanillin, one gram of riboflavin and one liter of propylene glycol are heated at 100° C. until complete solution is obtained.

Example V 10 grams of vanillin, 1.5 grams of riboflavin, 25 grams of nicotinamide, and 5 grams each of thiamine hydrochloride, vitamin B6 hydrochloride and calcium pantothenate together with one liter of proylene glycol are heated at 100° C. until complete solution is obtained. When cool, 10 grams of ascorbic acid are added. The solution is filtered.

I claim:

1. A liquid solution for oral or parenteral use comprising riboflavin in solution in a liquid medium selected from the group consisting of water and propylene glycol, in a concentration higher than that obtainable in said medium alone, and a monohydroxy, monoalkoxy benzaldehyde solubilizing agent, the monoalkoxy group containing not more than 5 carbon atoms therein.

2. The solution of claim 1, wherein the monohydroxy, monoalkoxy benzaldehyde is vanillin.

3. An aqueous solution comprising riboflavin in a concentration higher than that obtainable with water alone and a monohydroxy, monoalkoxy benzaldehyde solubilizing agent, the monoalkoxy group containing from 1 to 5 carbon atoms therein.

4. A propylene glycol solution comprising riboflavin in a concentration higher than that obtainable with propylene glycol alone and a monohydroxy, monoalkoxy benzaldehyde solubilizing agent, the monoalkoxy group containing from 1 to 5 carbon atoms therein.

5. The solution of claim 3, wherein the solubilizing agent is vanillin.

6. The solution of claim 4, wherein the solubilizing agent is vanillin.

JESSE CHARNEY.

REFERENCES CITED

The following references are of record in the file of this patent:

UNITED STATES PATENTS

| Number | Name | Date |
|---|---|---|
| 2,349,986 | Preiswerk | May 30, 1944 |
| 2,358,331 | Jurist | Sept. 19, 1944 |